United States Patent [19]

Orensteen et al.

[11] Patent Number: 4,650,283
[45] Date of Patent: Mar. 17, 1987

[54] DIRECTIONALLY IMAGED RETROREFLECTIVE SHEETING

[75] Inventors: Bruce D. Orensteen, St. Paul; Thomas I. Bradshaw, Afton, both of Minn.

[73] Assignee: Minnesota Mining and Manufacturing Company, St. Paul, Minn.

[21] Appl. No.: 637,474

[22] Filed: Aug. 3, 1984

[51] Int. Cl.[4] .............................................. G02B 5/128
[52] U.S. Cl. ..................................................... 350/105
[58] Field of Search ........................................ 350/105

[56] References Cited

U.S. PATENT DOCUMENTS

| | | | |
|---|---|---|---|
| 3,154,872 | 11/1964 | Nordgren | 40/135 |
| 3,190,178 | 6/1965 | McKenzie | 88/82 |
| 3,801,183 | 4/1974 | Sevelin et al. | 350/105 |
| 4,082,426 | 4/1978 | Brown | 350/105 |
| 4,099,838 | 7/1978 | Cook et al. | 350/105 |
| 4,200,875 | 4/1980 | Galanos | 346/1.1 |

Primary Examiner—John K. Corbin
Assistant Examiner—Vincent J. Lemmo
Attorney, Agent, or Firm—Donald M. Sell; James A. Smith; Roger R. Tamte

[57] ABSTRACT

Retroreflective sheeting of the prior art comprises a monolayer of transparent glass microspheres partially embedded in a binder layer and a specularly reflective layer covering the back surfaces of the microspheres. In the prior art, a laser beam directed at an angle to the face of the sheeting forms an image in such sheeting which is directional in that it can be viewed only from that angle. In the invention, such a directional image is provided by tiny ellipsoidal cavities, each opening through a back surface of the microsphere.

9 Claims, 3 Drawing Figures

DIRECTIONALLY IMAGED RETROREFLECTIVE SHEETING

FIELD OF THE INVENTION

The present invention provides new forms of directionally imaged sheeting, i.e., sheeting that has been provided with images that are directional in that they are viewable only within limited angles of viewing. The invention also provides novel methods for preparing the new sheeting involving controlled laser irradiation of certain forms of retroreflective sheeting, or of other forms of sheeting patterned after retroreflective sheeting ("retroreflective" sheeting reflects light back toward the source of the light, irrespective of the angle at which the light is incident on the sheeting, within rather wide ranges of incident angles).

BACKGROUND ART

Retroreflective sheeting in which a graphic image or other mark is built into the sheeting has found a number of important uses, particularly as distinctive labels useful to authenticate an article or document. For example, retroreflective sheetings in which legends are printed into the sheeting, as taught in U.S. Pat. Nos. 3,154,872; 3,801,183; 4,082,426; and 4,099,838, have found use as validation stickers for vehicle license plates and as security films for driver's licenses, government documents, phonograph records, tape cassettes, and the like.

Galanos, U.S. Pat. No. 4,200,875 forms directional images in "high gain retroreflective sheeting of the exposed-lens type" (col. 2, lines 3–4) by laser irradiation of the sheeting through a mask or pattern. The noted "high gain retroreflective sheeting" comprises "a plurality of transparent glass microspheres . . . that are partially embedded in a binder layer . . . and that are partially exposed above the binder layer, . . . with a reflective layer . . . adjacent to and disposed behind the embedded surface of each of the plurality of transparent glass microspheres" (col. 1, lines 25–32). The "binder layer, such as 12, FIG. 1, is pigmented in carbon black" (col. 1, line 55). When such "high gain retroreflective sheeting" is irradiated while positioned at a specific angle to a laser light beam, an image is formed which "can be seen thereafter with the naked eye if, and only if, the target (sheeting) is again positioned at that same angle" (col. 2, lines 9–11). When "a plurality of different preselected patterns are individually and separately recorded, at different angles, . . . then each of the recorded patterns is visible only when viewed at the angle at which it was recorded by the laser light beam radiation on the target" (col 2, lines 12–18).

Although the Galanos patent states that the sheeting he used is illustrated in FIG. 1, the pigmented under layer 12 would have prevented one from seeing any images except at approximately 90° to the face of the sheeting. However, the "Scotchlite" brand reflective sheetings "High Gain" No. 7610 and No. 7611, which apparently were used, were of substantially different construction. That is, the back hemisphere of each glass microsphere had a specularly reflective layer and its front hemisphere was open, thus permitting directional images to be formed over a wide range of angles.

The Galanos patent does not explain how a directional image is formed in the described retroreflective sheeting target other than to state that the laser preferably is "a high energy one of the Q-switched type having a power (energy?) of one Joule" and that its beam preferably "has a diameter of ⅛ inch and a pulse width of 90 nanoseconds" (col. 3, lines 34–38). The patent points out that the pattern of the image must be smaller than the target, but "that the diameter of the beam 22 as compared to the size of the pattern is immaterial, because even if the laser light beam (radiation) 22 is smaller than the pattern, the laser 21 can be moved in a scanning action" (sentence bridging col. 3 & 4). Galanos says that the directional image is "recorded on the target by structural alteration, i.e., modification of the target material" (col. 4, lines 32 and 51). From a bare reading of the Galanos patent, one skilled in the art would not know what constituent of the retroreflective sheeting material had been structurally altered. Based on our work in making the present invention, a likely explanation for the image formation observed by Galanos is a modification of the glass microspheres, e.g., by a localized devitrification, melting, or erosion of the glass at the back edges of the microspheres where the laser beam is focused.

Some advantages of the imaged sheeting taught in the Galanos patent are that the images are seen within sharply defined angular ranges, which could be used as an identifying characteristic to help assure that the sheeting is genuine; and the images can be formed in an already manufactured retroreflective sheeting. As compared to procedures of the four patents cited in the first paragraph of this "Background Art" section, the Galanos directional images can be formed in an already manufactured retroreflective sheeting, thereby avoiding the need for inventories of specially printed retroreflective sheeting and the need for long process runs to distribute the costs in setting up a printing operation.

However, the directionally imaged sheeting taught in the Galanos patent also has important disadvantages which limit its utility. For example, it is not useful to provide retroreflective images in outdoor environments where it may receive precipitation, because such precipitation can alter the optical relationships in the sheeting and obliterate or greatly reduce a retroreflective image.

DISCLOSURE OF INVENTION

The invention concerns retroreflective sheeting, which like the "Scotchlite" brand reflective sheetings apparently used by Galanos, comprises a monolayer of transparent microspheres partially embedded in a binder layer and a specularly reflective layer covering the back surfaces of the microspheres, and the sheeting contains at least one image which is directional in that it is viewable from the front of the sheeting only across a cone, the angle of which preferably is less than 90°. Also, as in Galanos, the retroreflective sheeting may include one or more additional directional images, each viewable from a different angle. Preferably, the cone across which each authenticating image is viewable does not overlap another cone, and hence the angle of each cone should be less than 60°. As in the retroreflective sheeting apparently used by Galanos, the binder layer preferably is rendered opaque by a pigment, ideally a light-colored pigment such as $TiO_2$ as opposed to Galanos' carbon black, to provide a high-contrast background for messages or pictures which may be superimposed over the reflective sheeting.

The retroreflective sheeting of the invention differs from that apparently produced by Galanos in that each of its directional images is provided by tiny cavities, each cavity opening through the back surface of a microsphere, and substantially every opening is smaller than the depth of the cavity.

Microscopic examination of typical directionally imaged sheeting of the invention reveals that the wall of each cavity is substantially an ellipsoid, the major axis of which extends orthogonally to the surface of the microsphere. Usually every cavity opening also is smaller than the minor axis of the ellipsoid.

What is necessary to form those cavities is not understood, but it may be necessary or at least desirable to use an infrared laser. The laser beam we have used is in the near infrared, having a wavelength on the order of one micrometer. Since the retroreflective sheeting is designed for reflecting visible light, its transparent microspheres are selected to focus a beam of visible light substantially at the reflective layer, in which event an infrared beam would be focused slightly beyond the reflective layer, that is, after being reflected. Hence, the energy of an infrared laser beam may be concentrated inside each microsphere at a point close to the reflective layer, with the heat thus absorbed forming a cavity which opens through the back surface of the microsphere at the axis of the laser beam. Photomicrographs of retroreflective sheeting of the invention show that the cavities are ellipsoidal and that every opening is smaller than the maximum width of the cavity, thus suggesting that the heating is more intense inside the bead than at its surface.

While the transparent microspheres of the retroreflective sheeting used by Galanos are uncovered and hence not suitable in outdoor environments in which they may receive precipitation, the retroreflective sheeting we have used in the invention has a transparent protective film as in U.S. Pat. No. 3,190,178. As there taught, the protective film may be sealed to the retroreflective sheeting in a grid pattern. Between narrow sealed areas are relatively broad unsealed areas wherein the front surfaces of the microspheres are optically exposed to an air interface. The sealed areas may form geometric patterns such as hexagons, and within the unsealed areas one or more restricted images may be formed in the practice of the invention. Messages or pictures may be imprinted on the protective film for such purposes as highway direction signs or billboards. While it is likely that the directionally imaged retroreflective sheeting of the invention can be made with uncovered sheeting of the type cited by Galanos, there is little reason to do so because of the fact that almost all retroreflective sheeting is used outdoors.

The directional images of the novel retroreflective sheeting can be used as an identifying characteristic to help assure that the sheeting is authentic. An authenticating directional image can be formed to be visible only at an angle at which the sheeting is not normally viewed, thus not interfering with the normal use of the sheeting. Even after the sheeting has so deteriorated in use that it is no longer retroreflective, the cavities provide an authenticating image that can be viewed from the same angle at which it was formed. By using directional images for authenticating purposes, manufacturers and sellers of quality sheeting cannot be unfairly accused of purveying inferior products.

In preferred retroreflective sheeting of the invention, the transparent microspheres are glass and have an average diameter of approximately 50 micrometers. For such sheeting, the laser exposure is preferably adjusted to form cavities having ellipsodial walls, a major axis (depth) of about 7.5 micrometers, and a minor axis (width) about 2.5 micrometers. A directional image provided by cavities of that size is viewable only across a cone of about 15°. Larger cavities afford larger viewing cones, but there seldom would be any reason for a directional image to be viewable across a cone exceeding 30°. On the other hand, a directional image which was viewable only across a cone of less than 10° might be difficult to locate.

THE DRAWING

In the drawing

Figure 1:
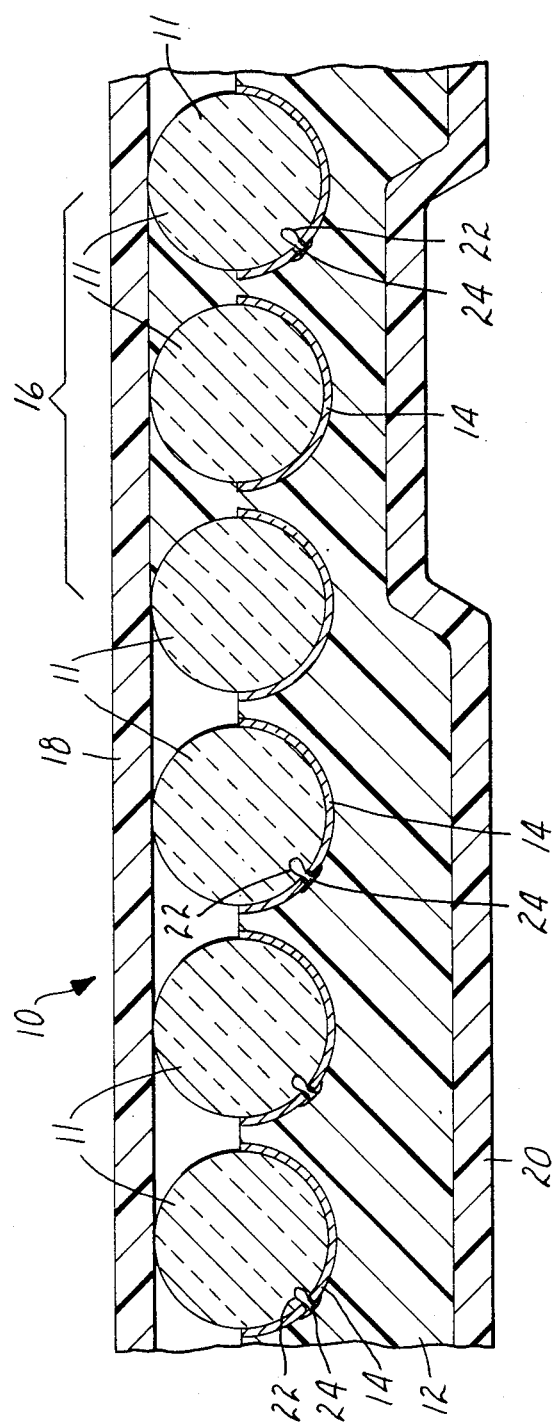
FIG. 1 is an enlarged schematic cross-section of a fragment of directionally imaged retroreflective sheeting of the invention.

The retroreflective sheeting 10 of FIG. 1 comprises a monolayer of glass microspheres 11 partially embedded in a binder layer 12. A specularly reflective layer 14 covers the back surface of each microsphere. In the area 16, the binder layer 12 has been forced into intimate hermetically sealed contact with a transparent protective film 18 as taught in the aforementioned U.S. Pat. No. 3,190,178. A low-adhesion carrier web 20 underlies the resin matrix 12.

Figure 2:
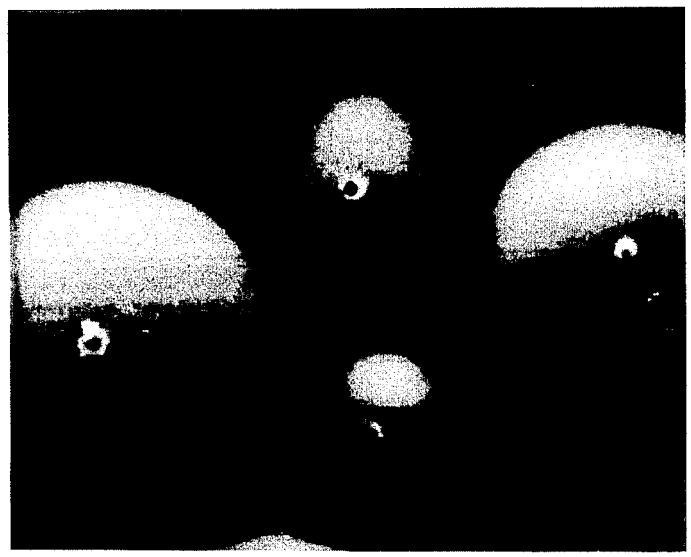
FIG. 2 is a photomicrograph at a magnification of about 1000× showing a fragment of a monolayer of transparent glass microspheres of directionally imaged sheeting of the invention.

The retroreflective sheeting 10 is equivalent to the sheeting shown in FIGS. 1 and 2 of U.S. Pat. No. 3,190,178 except that the specularly reflective layer 14 makes only hemispherical contact with each of the microspheres 11 and does not extend between adjacent microspheres. The hermetically sealed areas 16 together form geometric grid patterns such as hexagons or squares as illustrated in FIG. 1 of U.S. Pat. No. 3,190,178.

To comment on the schematic nature of FIG. 1, glass microspheres rarely will be of uniform size, and the thicknesses of the layers of the retroreflective sheeting may vary from area to area. The protective film 18 may be in tangential contact with some of the underlying microspheres or not, depending on a host of incidental factors. Each hermetically sealed area 16 (although less than 1 mm in breadth) extends across a large number of the microspheres 11.

The sheeting 10 has been irradiated with a laser beam at an angle of about 45° to the exposed surface of the protective film 18 to form a tiny cavity in each microsphere which has been penetrated by the laser beam. The walls of each cavity are substantially ellipsoidal. The opening 24 of substantially every cavity 22 is smaller than the radial depth of the cavity.

Figure 3:
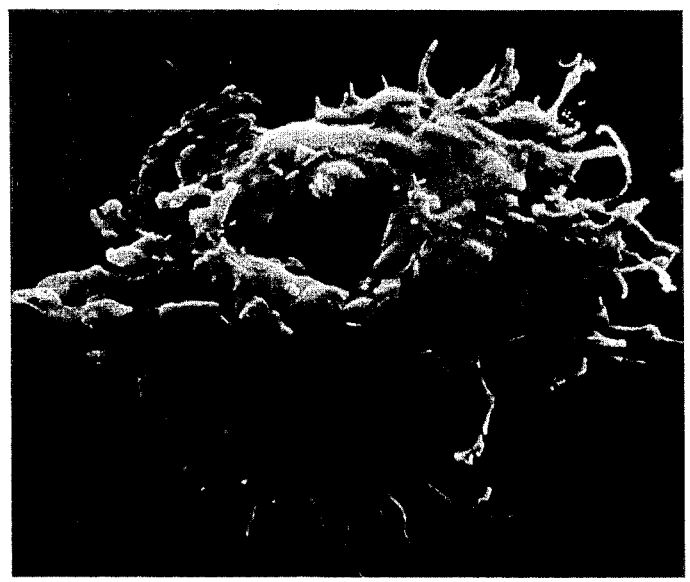
FIG. 3 is a photomicrograph at a magnification of about 10,000× of the imaged area of a glass microsphere of the directionally imaged sheeting of FIG. 2.

To make the photomicrographs of FIGS. 2 and 3, retroreflective sheeting as shown in FIG. 1 was directionally imaged at an angle of about 90° to the exposed surface of the protective film. After removing the protective film using a razor blade, a room-temperature-curing epoxy resin composition was cured in contact with the exposed microspheres. Then the binder layer was softened by soaking in methyl ethyl ketone and removed, thus exposing the specularly reflective layers of the microspheres. A photomicrograph of that area at 1000× as seen in FIG. 2 shows a cavity at approximately the center of the specularly reflective area of each microsphere. At 10,000× as in FIG. 3, it can be seen that molten glass has flowed out of the cavity and has been deposited around the opening of the cavity.

EXAMPLE 1

Retroreflective sheeting 10 as illustrated in FIG. 1 (available commercially as 3M high intensity grade reflective sheeting No. 3870 from Minnesota Mining and Manufacturing Company, the assignee of this application) has the following construction:

a monolayer of clear, transparent microspheres 11 having an average diameter of 66 micrometers and a refractive index of about 1.9 embedded to their circumferences in an opaque white polymeric binder layer 12 containing titanium dioxide pigment, a specularly reflective, vapor-deposited aluminum layer 14 approximately 100 nanometers thick covering the embedded hemisphere of each microsphere, a transparent polymethyl methacrylate protective film 18, sealed to the binder layer in a hexagonal pattern, a pressure-sensitive adhesive layer covering the back of the binder layer, and a protective removable liner covering the back surface of the pressure-sensitive adhesive layer.

The retroreflective sheeting 10 was irradiated from the front using a Q-switched neodymium-yttrium-aluminum-garnet laser which was operated at 100 watts average power, pulse width of about 200 nanoseconds, and pulse repetition frequency of 10 kilohertz. Its wavelength was 1.064 micrometers and its spot diameter was 3 mm. A mask was placed to effect selective irradiation of the sheeting in the pattern of a rectangle, 3.8 by 5.1 cm. The laser beam was scanned across the entire rectangle at normal incidence (90°) at a speed of 1000 cm/sec. At the end of each scan, the sheeting was moved 1.3 mm in a direction normal to the scan. By doing so, a dark rectangular directional image was formed which was conspicuous and visible within a cone of about 22° centered on the angle of irradiation.

Testing

After removing the protective film using a razor blade, a room-temperature curing epoxy resin composition was cured in contact with the exposed microspheres. The cured product was sectioned, polished and then examined with a microscope. This revealed cavities 22 as illustrated in FIG. 1. The cavities appeared to have ellipsoidal walls and were typically 8 micrometers deep, 3 micrometers wide at the minor axis of the ellipsoid, and 1-2 micrometers wide at their openings 24.

What is claimed is:

1. Retroreflective sheeting comprising a monolayer of transparent microspheres partially embedded in a light-colored binder layer and a specularly reflective layer covering the back surfaces of the microspheres, which sheeting contains at least one image viewable from the front of the sheeting only across a conical field of view, wherein the improvement comprises:

said image is provided by tiny cavities, each opening through a back surface of a microsphere, and substantially every opening is smaller than the depth of the cavity.

2. Retroreflective sheeting as defined in claim 1 wherein the wall of each cavity is substantially an ellipsoid, the major axis of which extends orthogonally to the surface of the microsphere, and each opening is smaller than the minor axis of the ellipsoid.

3. Retroreflective sheeting as defined in claim 1 wherein said binder layer comprises $TiO_2$.

4. Retroreflective sheeting as defined in claim 1 to which is sealed a transparent protective film in a grid pattern of narrow sealed areas and relatively broad unsealed areas, and within the unsealed areas the front surfaces of the microspheres are optically exposed to an air interface.

5. Retroreflective sheeting as defined in claim 4 wherein the protective film contains a transparent dye.

6. Retroreflective sheeting as defined in claim 1 wherein the microspheres are glass.

7. Method of directionally imaging retroreflective sheeting containing a monolayer of transparent glass microspheres partially embedded in a light-colored binder layer, wherein said microspheres are selected to focus a beam of visible light substantially at a reflective layer which covers the back surfaces of the microspheres, the front surfaces of which are uncovered, said method comprising directing an infrared laser beam at a specific angle toward the front of the sheeting to form tiny cavities, each opening through the back surface of a microsphere along the axis of the laser beam, substantially every opening being smaller than the depth of the cavity.

8. Method as defined in claim 7 wherein the wavelength of the laser beam is approximately one micrometer.

9. Method as defined in claim 7 wherein, prior to directing said laser beam toward said sheeting, a transparent protective film is sealed to the retroreflective sheeting in a grid pattern of narrow sealed areas and relatively broad unsealed areas within which the front surfaces of the microspheres are optically exposed to an air interface.

* * * * *